US012388216B2

(12) United States Patent
Quiter et al.

(10) Patent No.: US 12,388,216 B2
(45) Date of Patent: Aug. 12, 2025

(54) CONNECTOR, SEAL, SYSTEM, AND PRODUCTION METHOD

(71) Applicant: Yamaichi Electronics Deutschland GmbH, Aschheim-Dornach (DE)

(72) Inventors: Michael Quiter, Wenden (DE); Stefan Szynalski, Karlsfeld (DE)

(73) Assignee: Yamaichi Electronics Deutschland GmbH, Aschheim-Dornach (DE)

( * ) Notice: Subject to any disclaimer, the term of this patent is extended or adjusted under 35 U.S.C. 154(b) by 303 days.

(21) Appl. No.: 17/939,854

(22) Filed: Sep. 7, 2022

(65) Prior Publication Data

US 2023/0132251 A1 Apr. 27, 2023

(51) Int. Cl.
*H01R 13/52* (2006.01)
*H04R 1/10* (2006.01)

(52) U.S. Cl.
CPC ....... *H01R 13/5205* (2013.01); *H04R 1/1033* (2013.01)

(58) Field of Classification Search
CPC .............. H01R 13/5205; H04R 1/1033; H04R 25/604; H04R 2225/57; H04R 2420/09; H04R 25/556
See application file for complete search history.

(56) References Cited

U.S. PATENT DOCUMENTS

| | | | | |
|---|---|---|---|---|
| 6,371,807 | B1 * | 4/2002 | Takagishi | H01R 13/5221 439/587 |
| 6,648,686 | B2 | 11/2003 | Nishimoto | |
| 8,827,742 | B2 | 9/2014 | Wang | |
| 9,204,228 | B2 | 12/2015 | Chan et al. | |
| 10,498,070 | B2 * | 12/2019 | Zhou | H01R 13/5202 |
| 12,068,555 | B2 * | 8/2024 | Yang | H01R 12/79 |
| 2002/0064995 | A1 | 5/2002 | Nishimoto | |
| 2009/0304216 | A1 | 12/2009 | Hansen | |
| 2012/0082331 | A1 * | 4/2012 | Meosky | H04R 25/65 381/328 |
| 2013/0183844 | A1 | 7/2013 | Wang | |
| 2013/0279728 | A1 | 10/2013 | Chan et al. | |
| 2015/0201293 | A1 * | 7/2015 | Sanecki | H04R 25/60 381/55 |

(Continued)

FOREIGN PATENT DOCUMENTS

| | | | | |
|---|---|---|---|---|
| CA | 637753 A | | 3/1962 | |
| CA | 2770800 A1 | * | 2/2011 | H02J 50/12 |

(Continued)

OTHER PUBLICATIONS

Examination Report for German Application No. 10 2021 209 856.8 mailed May 3, 2022.

(Continued)

*Primary Examiner* — Travis S Chambers
(74) *Attorney, Agent, or Firm* — Thomas Horstemeyer, LLP

(57) ABSTRACT

A connector for connecting a hearing aid to a cable, the connector comprising the following: a connector housing with at least one recess; and a seal with a main body arranged at least in part(s) on an outer circumference of the connector housing, and at least one coupling portion arranged at least partially in the recess, so that the seal is connected to the connector housing at least in part(s) in a substantially positive manner.

12 Claims, 3 Drawing Sheets

(56) References Cited

U.S. PATENT DOCUMENTS

| | | | | |
|---|---|---|---|---|
| 2016/0043500 | A1 | 2/2016 | Mori et al. | |
| 2017/0179634 | A1* | 6/2017 | Du | H01R 13/521 |
| 2020/0389741 | A1 | 12/2020 | Agac | |

FOREIGN PATENT DOCUMENTS

| | | | |
|---|---|---|---|
| DE | 60108712 | T2 | 6/2005 |
| DE | 102007009748 | A1 | 9/2008 |
| DE | 102017128117 | A1 | 5/2019 |
| EP | 2119312 | A1 | 11/2009 |
| EP | 2654322 | A2 | 10/2013 |
| EP | 2654322 | A3 | 5/2014 |
| KR | 101851626 | B1 | 4/2018 |
| WO | 2014178292 | A1 | 11/2014 |

OTHER PUBLICATIONS

The Extended European Search Report for EP Application No. 22194272.5 mailed Jan. 27, 2023.

* cited by examiner

CONNECTOR, SEAL, SYSTEM, AND PRODUCTION METHOD

CROSS-REFERENCE TO RELATED APPLICATIONS

This application claims priority to German Application number 10 2021 209 856.8 filed on Sep. 7, 2021 and entitled "CONNECTOR, SEAL, SYSTEM, AND PRODUCTION METHOD," which is incorporated herein by reference in its entirety.

The invention relates to a connector for connecting a hearing aid to a cable, a seal, in particular for attachment to such a connector, a system comprising such a connector and a hearing aid, and a method for producing such a connector.

In the case of (plug) connections of two or more components, in particular comprising electronic contacts, it is often advantageous for them to be substantially sealed, so that the ingress of dust, sweat, dirt, water or the like into the contact area is avoided, but at least reduced. This can be achieved by provision of a seal, for example.

However, in particular seals for relatively small-dimensioned connections, such as for hearing aids, are often complicated both in their production and in their attachment to a component, which is usually accomplished by gluing.

However, gluing, i.e. a strongly coalesced connection, of such a seal to a component is problematic. For example, correct positioning of the seal can be difficult to achieve for small components and/or components of a specific shape. In addition, application of adhesive is rarely possible with the necessary precision and/or accuracy, which can result in an unfavorable protrusion of adhesive from the connection area and/or weak points in the connection between seal and connector can form. Likewise, a strongly coalesced connection between the component and the seal can be weakened and/or destroyed e.g. due to mechanical stress and/or the action of a solvent. Due to the mentioned and/or similar deficits, a reliable and high-quality production of sealed connections cannot be guaranteed, or not to the desired extent.

It is therefore an object of the present invention to provide a connector having a seal with improved attachability of the seal to the connector. In particular, it is an object to provide a method for producing such a connector and a system comprising a hearing aid and such a connector as well as a seal that can be easily and reliably attached to a hearing aid.

This object is solved by the subject matter of the independent claims. Advantageous embodiments are defined in the subclaims.

A first aspect of the invention relates to a connector, in particular for connecting a hearing aid to a cable, the connector comprising the following: a connector housing with at least one recess; and a seal with a main body arranged at least in part(s) on an outer circumference of the connector housing, and at least one coupling portion arranged at least partially in the recess, so that the seal is connected to the connector housing at least in part(s) in a substantially positive manner.

Forming a positive fit between the seal and the connector housing allows the seal to be advantageously attached to the connector, in particular with increased accuracy and/or robustness. In this way, increased durability and/or sealing of the seal can be achieved. The recess can be substantially round, circular, annular and/or polygonal, in particular square, and/or have correspondingly shaped portions. Alternatively and/or in addition, the recess can be conical and/or tapered and/or chamfered and/or cylindrical and/or have correspondingly shaped portions. Advantageously, the seal can thus be positioned and attached to the connector in a simple and reliable manner. Because of the positive fit, it can advantageously be ensured that the seal is correctly positioned on the connector, in particular the housing of the connector, and that the seal is securely and firmly fixed to the connector, in particular the housing of the connector.

The at least one recess preferably comprises or is an indentation and/or a groove and/or a notch and/or a hole, in particular a blind hole, and/or a bore, in particular a blind bore or a continuous opening or cavity, e.g. a continuous hole, in particular in the form of a hollow cylinder.

Alternatively and/or in addition, the at least one recess can comprise or be a through bore and/or a hole or cavity going completely through the connector housing, i.e. in particular comprise or be a hollow cylinder. A recess in the connector housing with or in the form of a through bore or a cavity, in particular a hollow cylinder and a coupling portion of the seal arranged therein, can achieve a particularly advantageous positive fit, since substantially opposite areas of the main body of the seal are connected to one another. In particular, the coupling portion impedes or prevents displacement of the respective areas of the main body of the seal away from the connector housing.

One or more coupling portions of the seal preferably extend substantially axially and/or radially from the main body of the seal. Alternatively and/or in addition, one or more coupling portions protrude from the main body. The coupling portion serves in particular to achieve and/or produce a positive fit between the connector housing and the seal. Here, it is preferred that several coupling portions protrude from the main body in different directions and engage in corresponding recesses of the connector housing, so that an improved positive fit is achieved. In other words, the connector housing can have a plurality of recesses and the seal can have a plurality of coupling portions. The connector housing 2 preferably comprises recesses and the seal 2 comprises corresponding coupling portions. It is also possible for the connector housing to comprise 3 or more recesses and for the seal to comprise 3 or more 2 corresponding coupling portions. It is also possible for the seal to have twice as many coupling portions as the connector housing has recesses. For example, the connector housing can have a continuous recess and the seal can have two coupling portions engaging the recess from opposite sides, i.e. form a positive fit with it. Alternatively, the connector housing can have two continuous recesses and the seal can have four coupling portions, with two coupling portions each engaging the opposite sides of the associated recess, i.e. forming a positive fit with it.

One or more recesses can be configured substantially identically and/or have different shapes. Alternatively and/or in addition, one or more recesses can be arranged substantially symmetrically, in particular axially symmetrically, or irregularly on or in the connector housing. One or more recesses can preferably be produced directly during the production of the connector housing, for example during the injection molding of the connector housing, and/or subsequently, for example by machining the connector housing.

The connector housing preferably comprises one or more thermoplastic polymers suitable for producing the connector housing by means of injection molding processes, such as PA (polyamide), PBT (polybutylene terephthalate), PLA (polylactide), ABS (acrylonitrile butadiene styrene copolymers), and/or LCP (liquid crystal polymer). More preferably, the connector housing comprises a biocompatible or "bio-inert" material, i.e. a material in which there is substantially no chemical and/or biological interaction between the connector housing and organic tissue, such as human skin.

The seal is preferably injected onto the connector housing, for example by an injection molding process. This is particularly advantageous since no additional work step for attaching and fastening the seal to the connector housing is required. Advantageously, this avoids that excess adhesive contaminates the connector housing and/or the seal is not adequately secured due to faulty or insufficient amount of adhesive.

The seal advantageously encloses at least a portion along the circumference of the connector housing and engages the at least one recess in such a way that the mobility of the seal is blocked, or at least significantly restricted. In this way, displacement of the seal relative to the connector housing—preferably in all spatial directions (xyz direction)—can be substantially prevented.

Fixing of the seal to the connector housing is preferably achieved by means of a positive fit, i.e. by bringing the seal into engagement with the at least one recess of the connector housing, and without adhesive such as glue. Advantageously, this avoids that excess adhesive contaminates the connector housing and/or the seal is not adequately secured due to faulty or insufficient amount of adhesive.

In one embodiment, the seal can be removed from the connector housing in a non-destructible manner. According to this embodiment, the seal can be removed non-destructively by plastically or elastically displacing, in particular stretching, the seal substantially in the radial direction of the seal such that the at least one coupling portion is moved out of the at least one recess. This ensures that inadvertent removal of the seal is substantially prevented, in particular by mating the connector to a socket receiving it, for example a hearing aid.

Alternatively, the seal and the recess can be designed such that the seal cannot be removed from the connector housing in a non-destructible manner. This can be particularly the case when the recess connects opposite sides of the connector housing. A coupling element arranged in the recess thus also connects opposite sides of the seal, so that the coupling element cannot be removed from the recess by stretching of the seal.

A further aspect of the invention relates to a seal, in particular for attachment to a connector or to a connector housing for connecting a hearing aid to a cable, comprising: a main body designed to be arranged at least in part(s) on an outer circumference of a connector housing; and at least one coupling portion configured and designed such that it is at least partially arranged in a recess of the connector housing.

The seal is preferably produced by means of injection molding, in particular by (direct) injection onto the connector housing, in particular of a connector for connecting a cable to a hearing aid. Alternatively, the seal can be produced separately and designed such that it is coupled to a component, in particular to a connector housing, and a positive fit is thus formed.

The seal is preferably made of elastomer, in particular liquid silicone rubber, and/or comprises injection-mouldable material, such as silicone and/or fluoroelastomer (e.g. Viton) and/or thermoplastic material or polyurethane (TPU) and/or thermoplastic elastomers (TPE) or consists of such. These and similar materials enable an advantageous production of the seal and preferred sealing properties due to their elasticity.

Another aspect of the invention relates to a system comprising: a hearing aid; and a connector as described in the process, wherein the hearing aid has a socket for receiving at least a part of the connector, the socket being designed such that when the connector is received it is substantially tightly connected to the hearing aid by the seal of the connector abutting the socket. The seal and/or the connector housing preferably have one or more of the features as described in the process.

A positive fit between the seal and the connector housing is preferably designed such that displacement of the seal relative to the connector housing by bringing the connector and the hearing aid together is prevented, or at least made more difficult.

A further aspect of the invention relates to a method for producing a connector with a seal, comprising: providing a connector housing with at least one recess; injecting a seal onto the connector housing, as a result of which the seal forms at least one coupling portion that is arranged at least in part(s) in the recess such that the seal is connected to the connector housing at least in part(s) in a substantially positive manner.

The seal is preferably injected onto the connector housing by means of an injection molding process. If TPU or TPE is used, the seal can be injected using a conventional thermoplastic injection molding process. When using liquid silicon rubber (LSR), attachment is accomplished using a conventional, non-thermal reaction of two components. A secure retention of the seal on the connector housing can be achieved by these methods. Also, no method step for attaching a separately manufactured seal to the connector housing is necessary. The seal and/or the connector housing preferably have one or more of the features as described in the process.

In the following, individual embodiments for solving the problem will be described by way of example with reference to the figures. Here, the individual embodiments described partly have features that are not absolutely necessary to implement the claimed subject matter, but which provide desired properties in certain applications. Thus, embodiments that do not have all the features of the embodiments described below shall also be considered to be covered by the technical teaching described. Furthermore, in order to avoid unnecessary repetition, certain features will only be mentioned in relation to individual embodiments described below. It is pointed out that the individual embodiments shall therefore not only be considered individually, but shall also be viewed in combination. Based on this synopsis, the skilled person will recognize that individual embodiments can also be modified by incorporating individual or multiple features of other embodiments. It is pointed out that a systematic combination of the individual embodiments with individual or multiple features that are described in relation to other embodiments can be desirable and useful and should therefore be taken into consideration and also be regarded as covered by the description.

DETAILED DESCRIPTION OF THE DRAWINGS

Figure 1:
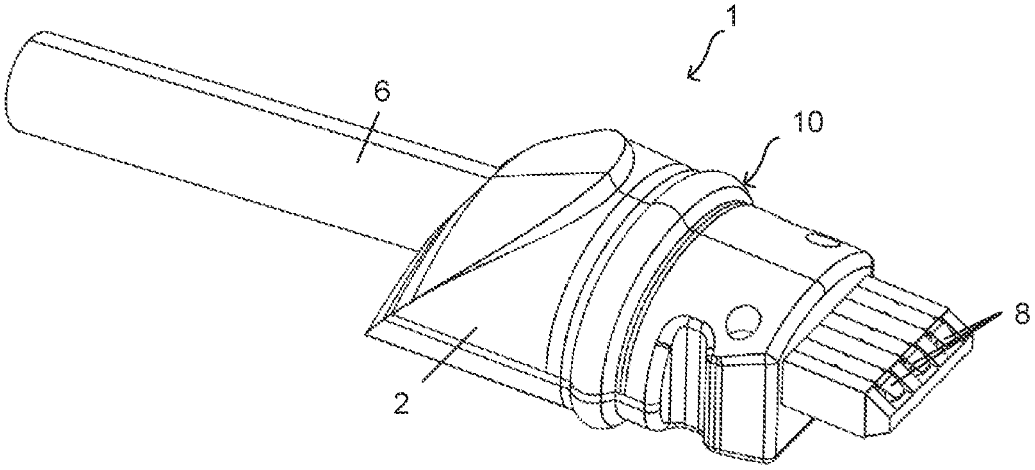
FIG. 1 shows a perspective view of an exemplary connector with seal.

FIG. 1 shows an exemplary connector 1 for a hearing aid with a connector housing 2. In this exemplary embodiment, the connector 1 has a cable 6 on one side of the connector housing 2, e.g. for connection to a loudspeaker, and on the opposite side one or more (e.g. six) electrical contacts 8. Furthermore, the connector 1 has a seal 10 that is preferably arranged circumferentially around the connector housing 2. Here, the seal is preferably arranged such that when the connector 1 is received by a socket (not shown), in particular by receiving at least part of the connector housing 2 and the one or more contacts 8, the contacts 8 are protected from environmental influences, such as dust and/or liquids. This is achieved in particular in that the seal 10 is slightly squeezed upon abutment with the socket and is substantially tightly and peripherally in abutment with the socket.

As an alternative to the embodiment shown, one or more seals 10 can be provided, which are only arranged in part(s) and/or not completely circumferentially on the connector housing 2.

The connector 1 shown is intended for connection to a hearing aid and/or a medical sensor and has relatively small dimensions. The connector housing preferably has a length of less than about 15 mm, more preferably less than about 8 mm, in particular about 4 mm, and a width of less than about 10 mm, more preferably less than about 5 mm, in particular about 2.6 mm, and a height of less than about 10 mm, more preferably less than about 5 mm, in particular about 2 mm.

The seal 10 has preferably been "injected" onto the (prepared) connector housing 2 by means of injection molding. This has the advantage that an exact fit of the seal 10 is achieved and/or an additional work step for attaching a separately produced seal 10 to the connector housing 2 is eliminated. By producing, e.g. injecting the seal 10 directly onto the connector housing 2, a secure retention of the seal on the connector housing 2 can also be achieved without using an adhesive, such as a glue.

Figure 2:
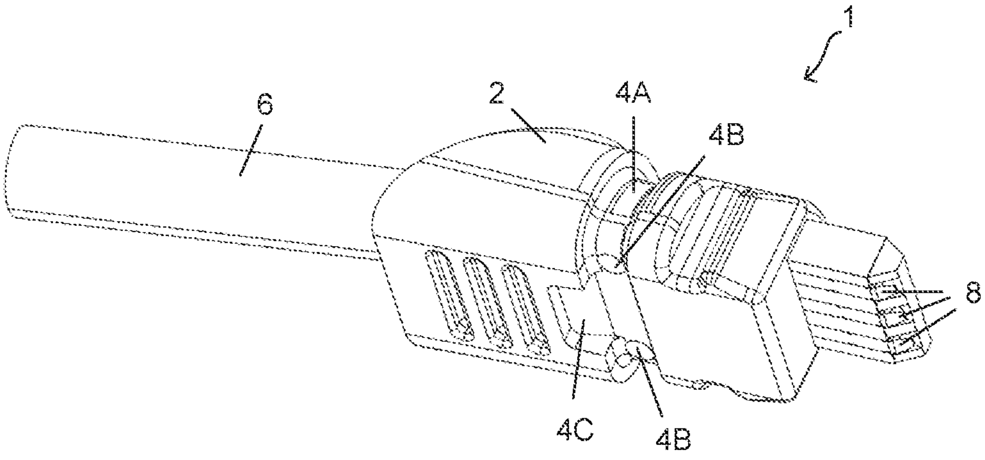
FIG. 2 shows a perspective view of an exemplary connector without a seal.

FIG. 2 shows a further view of the connector 1 of FIG. 1, but without the seal 10. The connector housing 2 has at least one (e.g. four) recesses in which the seal 10 is or can be arranged at least in part(s). The connector housing 2 and the seal 10 are preferably formed such that portions of the seal 10 engage the recesses of the connector housing 2 and produce a positive fit. The shown exemplary embodiment of the connector 1 comprises a groove 4A that extends around at least a part of an outer circumference of the connector housing 2 and inwardly of the connector housing 2. By arranging the seal 10 in the groove 4A, a positive fit is achieved between the seal 10 and the connector housing 2, which makes it difficult or impossible for the seal 10 to be displaced and/or separated from the connector housing 2. In particular, a displacement of the seal 10 in the longitudinal direction of the connector 1 can be counteracted by such a recess or a similar one. The groove 4A preferably has a depth and/or width of less than about 2 mm, in particular about 0.5 mm. The groove 4A can have a substantially round and/or an angular surface.

Alternatively and/or in addition, the connector housing 2 has one or more recesses of a different shape in order to achieve an improved positive fit between the seal 10 and the connector housing 2. The example shown further comprises two holes and/or bores 4B, in particular substantially circular recesses, which extend inwardly from an outer surface of the connector housing 2. One or more such holes and/or bores 4B can be formed as a blind hole/blind bore, i.e. the hole or bore does not extend through the entire connector housing 2. Alternatively, one or more recesses 4B may extend completely through the connector housing 2 and connect substantially opposite areas on the surface of the connector housing 2. For example, the recesses can have the form of a hollow cylinder that extends through the connector housing 2 and connects opposite outer sides of the connector housing 2. In other words, the connector housing may have two substantially opposite holes 4B that are tubularly connected to each other. By arranging a coupling portion of the seal 10 in one or more recesses, in particular in such holes/bores 4B or hollow cylinders or tubes, a particularly preferred positive fit is achieved, since displacement of the seal 10 in all three spatial directions (xyz directions) is counteracted. In particular for a continuous hole or a continuous bore 4B, i.e. the cylindrical cavity described above, a coupling portion of the seal 10 arranged in it can particularly advantageously impede or prevent displacement and/or detachment of the seal 10 from the connector housing 2. A hole and/or a bore 4B and/or a cylindrical or tubular cavity preferably has a depth of greater than about 0.1 mm, more preferably greater than about 0.5 mm, and a diameter of greater than about 0.1 mm, in particular about 0.3 mm. In addition, the transitions between connector housing 2 and hole/bore 4B can be chamfered. Furthermore, the holes/bores or the cavity can be of a (polygonal) angular design.

The connector housing 2 shown preferably further has an indentation 4C extending from the groove 4A in the longitudinal direction of the connector 1. A coupling portion of a seal 10 located therein prevents and/or makes it more difficult for the seal 10 to move, in particular in the circumferential direction of the connector housing 2. Alternatively and/or in addition, an indentation 4C can have more complex geometries, for example one or more branches and/or uneven contours, in order to achieve a better positive fit.

A recess can be produced directly during the production of the connector housing 2, for example during the injection molding and/or deep drawing of the connector housing 2. Alternatively and/or in addition, a recess can be produced at a later time, for example by partially removing the connector housing 2, in particular by grinding and/or drilling.

Figure 3:
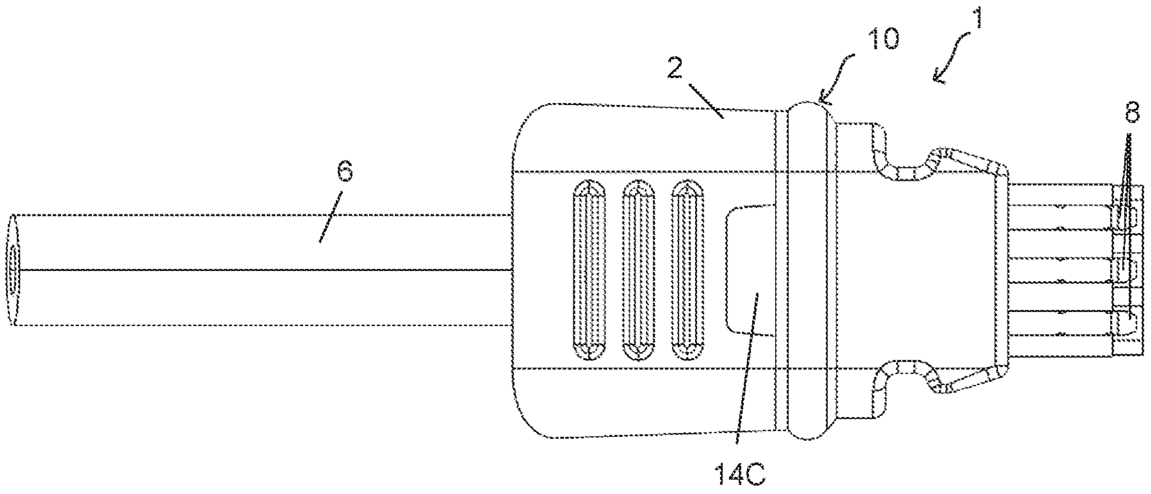
FIG. 3 shows a plan view of an exemplary connector with seal.
Figure 4:
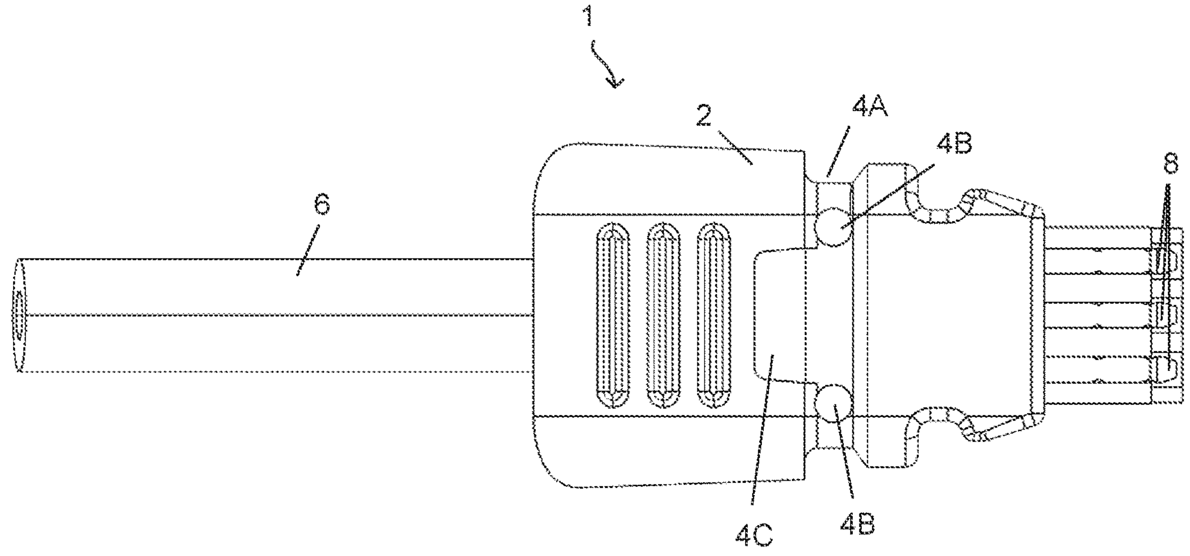
FIG. 4 shows a top view of the exemplary connector of FIG. 3 without seal.

FIGS. 3 and 4 show a top view of an exemplary connector 1 with and without seal 10. In FIG. 3 it can be seen that the seal 10 preferably protrudes beyond the circumference of the connector housing 2, for example by more than about 0.05 mm, for example by about 0.2 mm. This allows an improved seal to be achieved when the connector has been at least partially received by a socket. As shown in FIG. 4, the holes/bores 4B in the connector housing are continuous so that they connect substantially opposite areas of the surface of the connector housing 2.

In order to achieve improved retention of the seal 10 on a connection housing 2, the surface can have an increased roughness on or in one or more recesses. Alternatively and/or in addition, improved engagement of the seal 10 in the recess can be achieved by an angular shape of the recesses, i.e. a shape with substantially non-rounded edges.

Figure 5:
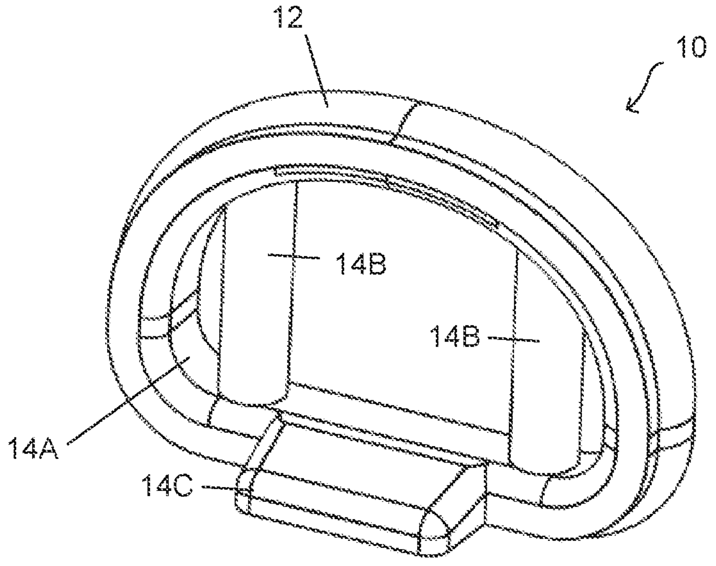
FIG. 5 shows an exemplary seal.
Figure 6:
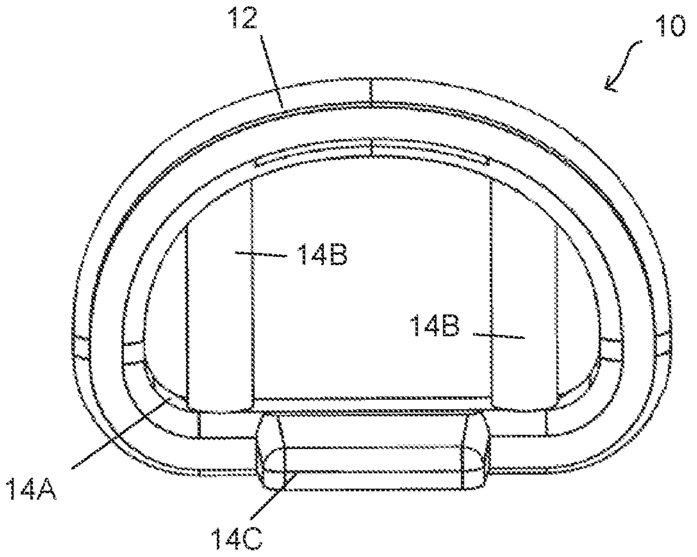
FIG. 6 shows a further view of the exemplary seal of FIG. 5.

FIGS. 5 and 6 show an exemplary seal 10 that can be provided in particular on the connector 1 of FIGS. 1 to 4. The seal 10 shown has a generally round and/or oval and/or annular main body 12. The main body 12 is preferably designed such that it can be arranged at least partially in a groove 4A of the connector housing 2. In particular, the seal 10 has a first coupling portion 14A abuts on the surface of the groove 4A and thus produces a substantially positive coupling and/or connection with the connector housing 2. The outer circumference of the main body 12 of the exemplary seal 12 is preferably slightly larger, for example by about 0.2 mm, than the circumference of the connector housing 2 in an area adjacent to the intended position of the seal 10, so that an advantageous seal can be achieved upon arrangement in a socket by compression of the seal 10. The diameter of the main body 12 of the seal 10 is e.g. greater than about 0.1 mm, more preferably about 0.4 mm, more preferably greater than the depth of a groove 4B in which the main body 12 will be located. The main body 12 can be substantially round or angular.

The seal 10 shown also has two exemplary coupling portions 14B that are designed to be arranged in holes/bores 4B, in particular of a connector housing of FIGS. 1-4, preferably with a substantially precise fit. The coupling portions 14B are substantially columnar and connect substantially opposite areas of the main body 12 of the seal 10. Such or a similar coupling portion is particularly advantageous since it prevents, or at least reduces, a deformation of the main body 12. As a result, an improved fit of the seal 10 on the connector housing 2 can be achieved. In particular, with such a configuration of the seal 10, the seal 10 cannot be detached from the connector housing 2 in a non-destructible manner. The coupling portions 14B preferably have a diameter of greater than about 0.1 mm, in particular about 0.3 mm. Alternatively, the coupling portions 14B can be angular, in particular square or octagonal.

As an alternative to the continuous coupling portions 14B shown, it is also possible to provided one or more columns that are only connected to the main body 12 at one end. This is particularly advantageous since it enables the connector housing 2 and the seal 10 to be produced separately and the seal 10 to be mounted on the connector housing 2. Such a seal 10 can also be detached non-destructively from the connector housing 2 by stretching in the radial direction.

The seal 10 shown also has a further, optional coupling portion 14C, which is configured to be arranged in the indentation 4C of the connector housing 2. Alternatively and/or in addition, the coupling portion 14C—corresponding to an associated indentation 4C—can have more complex geometries, for example one or more branches and/or uneven contours, in order to achieve a better positive fit.

The seal 10 is preferably made of injection moldable material, for example elastomer such as liquid silicone rubber (liquid silicon rubber (LSR)). The seal 10 can alternatively consist of other and/or additional materials, in particular elastic materials such as NBR (acrylonitrile butadiene rubber), EPDM (ethylene propylene diene rubber), TPE (thermoplastic elastomer) and/or TPU (Thermoplastic polyurethane).

The invention claimed is:

1. A connector (1) for connecting a hearing aid to a cable (6), the connector comprising:

a connector housing (2) with at least one recess;

a seal (10) with a main body (12) arranged at least in part(s) on an outer circumference of the connector housing (2), and at least one coupling portion (14A-C) arranged at least partially in the recess, so that the seal (10) is connected to the connector housing (2) at least in part(s) in a substantially positive manner;

at least one hollow bore (4B) that extends completely through the connector housing (2); and wherein the at least one coupling portion (14A-C) is substantially columnar and connects opposing areas of the main body (12) of the seal (10) through the at least one hollow bore.

2. The connector (1) to claim 1, wherein the at least one recess further comprises a groove (4A) and/or an indentation (4C) and/or a cavity.

3. The connector (1) to claim 1, wherein the coupling portion (14A-C) of the seal (10) extends substantially axially and/or radially from the main body (12) of the seal (10).

4. The connector (1) to claim 1, wherein the seal (10) is injected onto the connector housing (2).

5. The connector (1) to claim 1, wherein the seal (10) encloses the connector housing (2) at least in part(s) and engages the at least one recess, so that a displacement of the seal (10) relative to the connector housing (2) is substantially prevented.

6. The connector (1) to claim 1, wherein fixing of the seal (10) to the connector housing (2) is accomplished by means of a positive fit and without adhesive; and/or wherein a non-destructive removal of the seal (10) exclusively takes place by stretching the seal (10) substantially in the radial direction such that the at least one coupling portion (14A-C) is moved out of the at least one recess.

7. A system comprising:

a hearing aid; and a connector (1) according to claim 1, wherein the hearing aid has a socket for receiving at least a part of the connector (1), the socket being configured such that when the connector (1) is received it is substantially tightly connected to the hearing aid by the seal (10) of the connector (1) abutting the socket.

8. A seal (10) for attachment to a connector (1) for connecting a hearing aid to a cable (6), comprising:

a main body (12) designed to be arranged at least in part(s) on an outer circumference of a connector housing (2); and at least one coupling portion (14A-C) designed and configured in such a way to be arranged at least partially in a recess of the connector housing (2) and which is substantially columnar and connects opposing areas of the main body (12) of the seal (10), the substantially columnar at least one coupling portion (14A-C) extending through a continuous bore, the continuous bore extending entirely through the connector housing.

9. The seal (10) according to claim 8, wherein the seal (10) is injected onto the connector housing (2).

10. A method for producing a connector (1) with a seal (10), comprising:

providing a connector housing (2) with at least one recess;

injecting a seal (10) onto the connector housing (2), as a result of which the seal (10) forms at least one coupling portion (14A-C), the at least one coupling portion (14A-C) being substantially columnar and connecting opposing areas of a main body (12) of the seal (10) through at least one hollow bore (4B), the hollow bore (4B) extending completely through the connector housing (2), and the at least one coupling portion being arranged at least in part(s) in the recess such that the seal (10) is connected to the connector housing (2) at least in part(s) in a positive manner.

11. The method according to claim 10, wherein the at least one recess of the connector housing (2) comprises a groove (4A) and/or an indentation (4C), and wherein the seal (10) is injected onto the connector housing (2).

12. A connector (1) for connecting a hearing aid to a cable (6), the connector comprising:

a connector housing (2) with at least one recess;

a seal (10) with a main body (12) arranged at least in part(s) on an outer circumference of the connector housing (2), and at least one coupling portion (14A-C) arranged at least partially in the recess, so that the seal (10) is connected to the connector housing (2) at least in part(s) in a substantially positive manner;

at least one blind hollow bore (4B) that extends through a portion of the connector housing (2); and at least one coupling portion (14A-C) is substantially columnar and is connected at one end to a single area of the main body (12) of the seal (10), the at least one coupling portion (14A-C) extending into the at least one blind hollow bore (4B) and is fully contained within the at least one blind hollow bore (4B).

* * * * *